(12) United States Patent
Masuda

(10) Patent No.: US 8,757,814 B2
(45) Date of Patent: *Jun. 24, 2014

(54) PROJECTOR HAVING LIGHT SOURCE UNIT INCLUDING EXCITATION LIGHT SOURCE, OPTICAL WHEEL, LIGHT EMITTING LIGHT SOURCE, AND CONTROLLER

(71) Applicant: Casio Computer Co., Ltd., Tokyo (JP)

(72) Inventor: Hiroki Masuda, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/860,732

(22) Filed: Apr. 11, 2013

(65) Prior Publication Data

US 2013/0293850 A1 Nov. 7, 2013

Related U.S. Application Data

(62) Division of application No. 12/827,141, filed on Jun. 30, 2010, now Pat. No. 8,434,875.

(30) Foreign Application Priority Data

Jun. 30, 2009 (JP) ................................ 2009-155478
Jun. 8, 2010 (JP) ................................ 2010-130932

(51) Int. Cl.
  *G03B 21/20* (2006.01)
  *G03B 21/14* (2006.01)
  *G03B 21/26* (2006.01)

(52) U.S. Cl.
  USPC ................................ 353/85; 353/84; 353/30

(58) Field of Classification Search
  USPC ................. 359/885, 890, 892, 884, 722, 723; 353/85, 30, 31, 94, 122, 84; 362/84, 362/800, 260, 259

See application file for complete search history.

(56) References Cited

U.S. PATENT DOCUMENTS

| 5,868,482 | A | 2/1999 | Edlinger et al. |
| 6,147,720 | A * | 11/2000 | Guerinot et al. ............... 348/744 |
| 6,798,469 | B2 | 9/2004 | Kimura |
| 7,322,703 | B2 * | 1/2008 | Matsui ............................ 353/84 |
| 7,547,114 | B2 * | 6/2009 | Li et al. .......................... 362/231 |
| 7,604,356 | B2 | 10/2009 | Kubo |
| 7,871,168 | B2 * | 1/2011 | Liu et al. ......................... 353/84 |

(Continued)

FOREIGN PATENT DOCUMENTS

| JP | 2000-096046 A | 4/2000 |
| JP | 2001-356701 A | 12/2001 |

(Continued)

*Primary Examiner* — Pascal M Bui Pho
(74) *Attorney, Agent, or Firm* — Holtz Holtz Goodman & Chick PC

(57) ABSTRACT

A light source unit includes an optical wheel having a plurality of segment areas, the segment areas including at least two luminescent material layers having different characteristics and a transmission portion provided in a circumferential direction. The light source unit further includes a rotation driving unit for driving to rotate the optical wheel, an excitation light source for shining light onto the optical wheel, a light emitting element, and a light guiding optical system for collecting a light beam from the optical wheel and a light beam from the light emitting element to a same optical path. The excitation light source is selectively turned on to illuminate the transmission portion or the at least two luminescent material layers, and the light emitting light source is turned on for a period of time during which the excitation light source does not shine the excitation light.

4 Claims, 12 Drawing Sheets

(56) References Cited

U.S. PATENT DOCUMENTS

| | | | |
|---|---|---|---|
| 8,434,875 B2 * | 5/2013 | Masuda | 353/85 |
| 2006/0007407 A1 | 1/2006 | Matsui | |
| 2006/0087625 A1 | 4/2006 | Liu | |
| 2006/0132725 A1 | 6/2006 | Terada et al. | |
| 2009/0034284 A1 | 2/2009 | Li et al. | |
| 2009/0322797 A1 * | 12/2009 | Tokui | 345/690 |
| 2012/0062857 A1 * | 3/2012 | Saitou et al. | 353/98 |

FOREIGN PATENT DOCUMENTS

| | | |
|---|---|---|
| JP | 2004-220015 A | 8/2004 |
| JP | 2004-286963 A | 10/2004 |
| JP | 2004-341105 A | 12/2004 |
| JP | 2006-023436 A | 1/2006 |
| JP | 2006-119589 A | 5/2006 |
| JP | 2006-162658 A | 6/2006 |
| JP | 2006-317845 A | 11/2006 |
| JP | 2007-121971 A | 5/2007 |
| JP | 2007-218956 A | 8/2007 |
| JP | 2008-052070 A | 3/2008 |
| JP | 2008-164699 A | 7/2008 |
| JP | 2009-088299 A | 4/2009 |
| WO | WO 2007/141688 A1 | 12/2007 |
| WO | WO 2009/069010 A1 | 6/2009 |

* cited by examiner

FIG. 6A

|  | DIFFUSION AND TRANSMISSION AREA | PRIMARY LUMINESCENT LIGHT EMITTING AREA | SECONDARY LUMINESCENT LIGHT EMITTING AREA |
|---|---|---|---|
| EXCITATION LIGHT SOURCE | ON | ON | OFF |
| RED LIGHT SOURCE | OFF | OFF | ON |
| OBTAINED LIGHT | LIGHT OF A BLUE WAVELENGTH BAND | LIGHT OF A GREEN WAVELENGTH BAND | LIGHT OF A RED WAVELENGTH BAND |

FIG. 6B

|  | DIFFUSION AND TRANSMISSION AREA | PRIMARY LUMINESCENT LIGHT EMITTING AREA | SECONDARY LUMINESCENT LIGHT EMITTING AREA |
|---|---|---|---|
| EXCITATION LIGHT SOURCE | ON | OFF | ON |
| RED LIGHT SOURCE | OFF | ON | OFF |
| OBTAINED LIGHT | LIGHT OF A BLUE WAVELENGTH BAND | LIGHT OF A RED WAVELENGTH BAND | LIGHT OF A GREEN WAVELENGTH BAND |

(Y,Gb)3 Al5O12: Ce

WAVELENGTH (nm)

PEAK WAVELENGTH : 570nm
WAVELENGTH BAND AT
    HALF-POWER POINT : 130nm

BaMg2Al16O27: Eu, Mn

WAVELENGTH (nm)

PEAK WAVELENGTH : 515nm
WAVELENGTH BAND AT
    HALF-POWER POINT : 30nm

PROJECTOR HAVING LIGHT SOURCE UNIT INCLUDING EXCITATION LIGHT SOURCE, OPTICAL WHEEL, LIGHT EMITTING LIGHT SOURCE, AND CONTROLLER

CROSS-REFERENCE TO RELATED APPLICATIONS

This is a Divisional of U.S. application Ser. No. 12/827,141, filed Jun. 30, 2010, which is based upon and claims the benefit of priority under 35 USC 119 of Japanese Patent Application No, 2009-155478, filed Jun. 30, 2009, and Japanese Patent Application No. 2010-130932, filed Jun. 8, 2010, the entire contents of all of which are incorporated herein by reference.

BACKGROUND OF THE INVENTION

1. Field of the Invention

The present invention relates to a light source unit which includes a wheel in which a luminescent material layer is provided in a circumferential direction and a projector which includes the light source unit.

2. Description of the Related Art

In these days, data projectors are used on many occasions as image projection apparatuses which project images of screens and video images of personal computers, as well as images of image data stored in memory cards on to a screen. These projectors are such that light emitted from a light source is caused to converge to a micromirror device called DMD (Digital Micromirror Device) or a liquid crystal plate for display of a color image on the screen.

In projectors of the type described above, conventionally, projectors using a high-intensity discharge lamp as a light source have been the mainstream of projectors. In recent years, however, there have been made many developments and proposals on light source units which utilize a semiconductor light emitting device such as a light emitting diode (LED), a laser diode (LD), or a device utilizing organic EL technology as a light emitting device of a light source unit.

Japanese Unexamined Patent Publication No. 2004-220015 (JP-A-2004-220015) proposes a light source unit which includes light emitting devices and in which the light emitting devices are disposed in a matrix configuration in order to increase the quantity of light. In the invention of the patent document, however, bright points of the light emitting devices are increased, and therefore, the convergence of light emitted from the respective bright points to a single point by an optical system arranged downstream of the light emitting devices becomes difficult, leading to a problem that the light utilization efficiency of light emitted from the respective light emitting diodes is reduced.

In addition, Japanese Unexamined Patent Publication No. 2004-341105 (JP-A-2004-341105) proposes a light source unit which includes an optical wheel in which luminescent materials are disposed in a circumferential direction and an ultraviolet light emitting diode. The light source unit proposed in this patent document is configured so that ultraviolet light is shone on to the optical wheel from a rear surface side thereof as excitation light and light emitted from a front surface side of the optical wheel is utilized as light source light.

A light source unit that is to be used in a projector is required to generate at least light of wavelength bands of red, green and blue, which are the three primary colors of light. In a configuration which utilizes an optical wheel like one shown in JP-A-2004-341105, the three primary colors of light can be generated by disposing a red luminescent material layer, a green luminescent material layer and a blue luminescent material layer are disposed end to end in a circumferential direction of the optical wheel.

However, in the light source unit which utilizes the optical wheel in the red luminescent material layer, the green luminescent material layer and the blue luminescent material layer are disposed end to end in the circumferential direction, there is a problem inherent therein that in the event of the luminescent material layers of the respective colors are disposed uniformly, there has existed a problem that a difference in luminance between light beams of red, green and blue wavelength bands is increased.

Then, there is proposed a light source unit in which at least a plurality of luminescent material layers are disposed end to end in a circumferential direction of an optical wheel, a blue laser emitter is used as an excitation light source, and an independent light emitting device is added further as a light emitting light source.

In the light source unit configured in the way described above, the difference in luminance between the light beams having different wavelength bands can be reduced. However, since the non-use area is caused on the optical wheel, an effective use of this area has been a problem to be solved.

SUMMARY OF THE INVENTION

An object of the invention is to provide a light source unit which utilizes an optical wheel in which an excitation light source and at least a plurality of luminescent material layers are disposed end to end in a circumferential direction and an independent light emitting light source, wherein an effective use of the optical wheel is realized by forming an additional different luminescent material layer in a non-use area on the optical wheel and a projector which includes the light source unit.

With a view to attaining the object, according to an aspect of the invention, there is provided a light source unit comprising:

an optical wheel having a plurality of segment areas and including luminescent light emitting areas where two or more luminescent material layers having different characteristics are provided end to end in a circumferential direction;

a wheel motor for driving to rotate the optical wheel;

an excitation light source for shining light on to the optical wheel as excitation light or as light of a predetermined wavelength band;

a light emitting light source provided out of an optical path of the optical wheel; and a collective optical system for collecting a light beam emitted from the optical wheel and a light beam emitted from the light emitting light source for convergence to the same optical path, wherein the excitation light source is selectively turned on to selectively illuminate the two or more luminescent material layers having different characteristics which are disposed on the luminescent light emitting areas by discriminating the luminescent material layers into an area on to which the excitation light is shone and an area on to which the excitation light is not shone, and wherein the light emitting light source is turned on for a period of time during which the excitation light source does not shine the excitation light.

With a view to attaining the object, according to another aspect of the invention, there is provided a projector comprising a light source unit, a light guiding unit, a display device, a projection optical system, and a projector control means having a light source control means and a display device control means, wherein projection in different projection mode including a primary projection mode and a secondary projection mode is enabled, and wherein the light source unit is a light source unit as set forth in any of claims 1 to 7 and is disposed so that light source light is caused to converge to an incident plane of the light guiding unit.

BRIEF DESCRIPTION OF THE DRAWINGS

FIGS. 6A and 6B show explanatory diagrams which explain a control method of the light source unit in the projector according to the embodiment of the invention.

DETAILED DESCRIPTION OF THE PREFERRED EMBODIMENT

Figure 1:
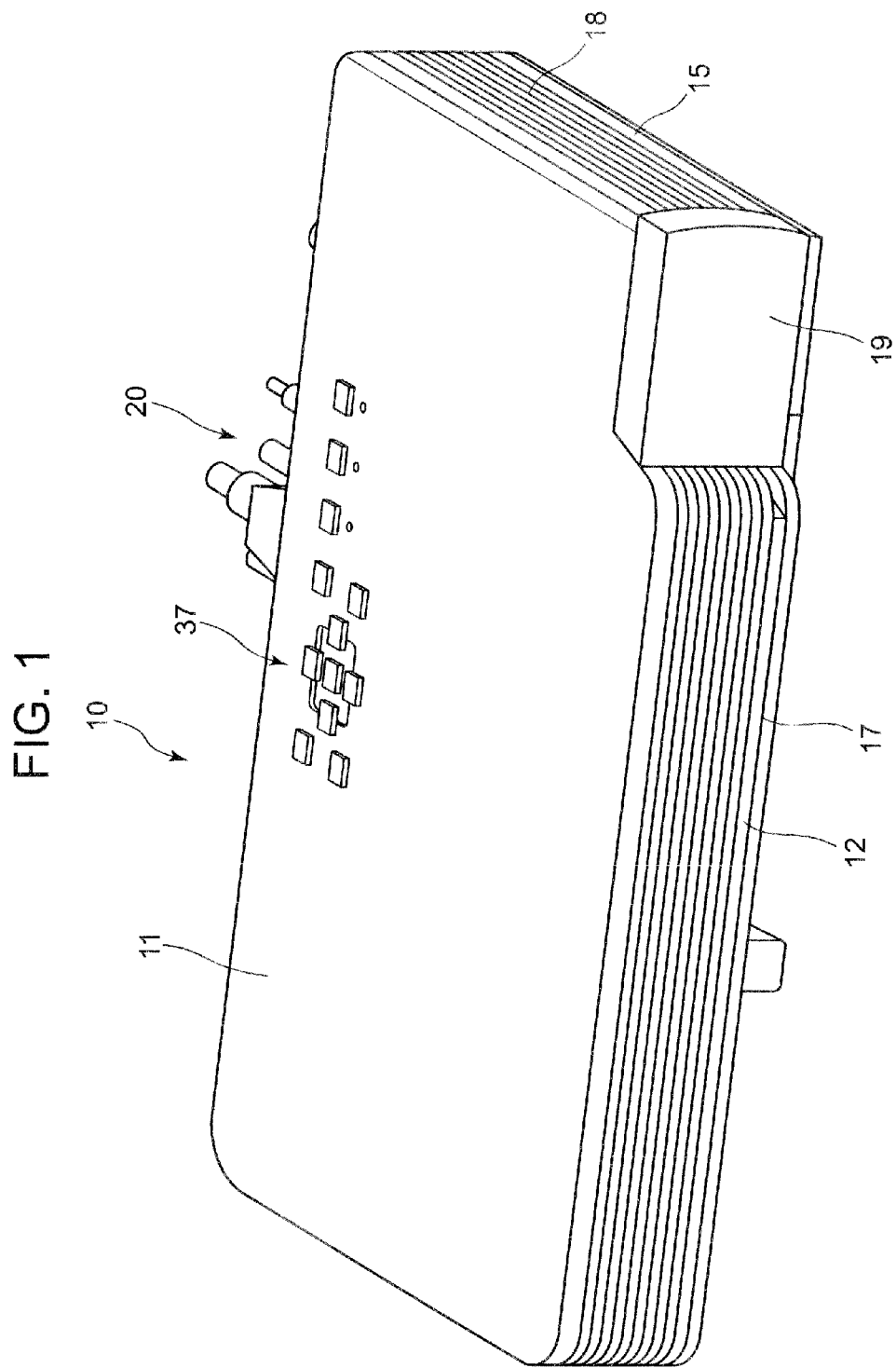
FIG. 1 is a perspective view showing an external appearance of a projector according to an embodiment of the invention.

Hereinafter, an embodiment of the invention will be described in detail by reference to the accompanying drawings. FIG. 1 is a perspective view showing an external appearance of a projector 10. In this embodiment, left and right denote, respectively, left and right directions with respect to a projecting direction, and front and rear denote, respectively, front and rear directions with respect to a traveling direction of a light beam. The projector 10 of the embodiment enables projection in different modes including a primary projection mode and a secondary projection mode.

As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of inside air outlet holes 17 in the front panel 12. Further, although not shown, the projector 10 includes an Ir reception part for receiving a control signal from a remote controller.

In addition, a keys/indicators part 37 is provided on an upper side panel 11 which makes up the main body case. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of outside air inlet holes 18 are formed in proximity to respective lower portions of a right-hand side panel 14 which constitutes a side panel, not shown, of the main body case and a left-hand side panel 15 which is a side panel shown in FIG. 1.

Figure 2:
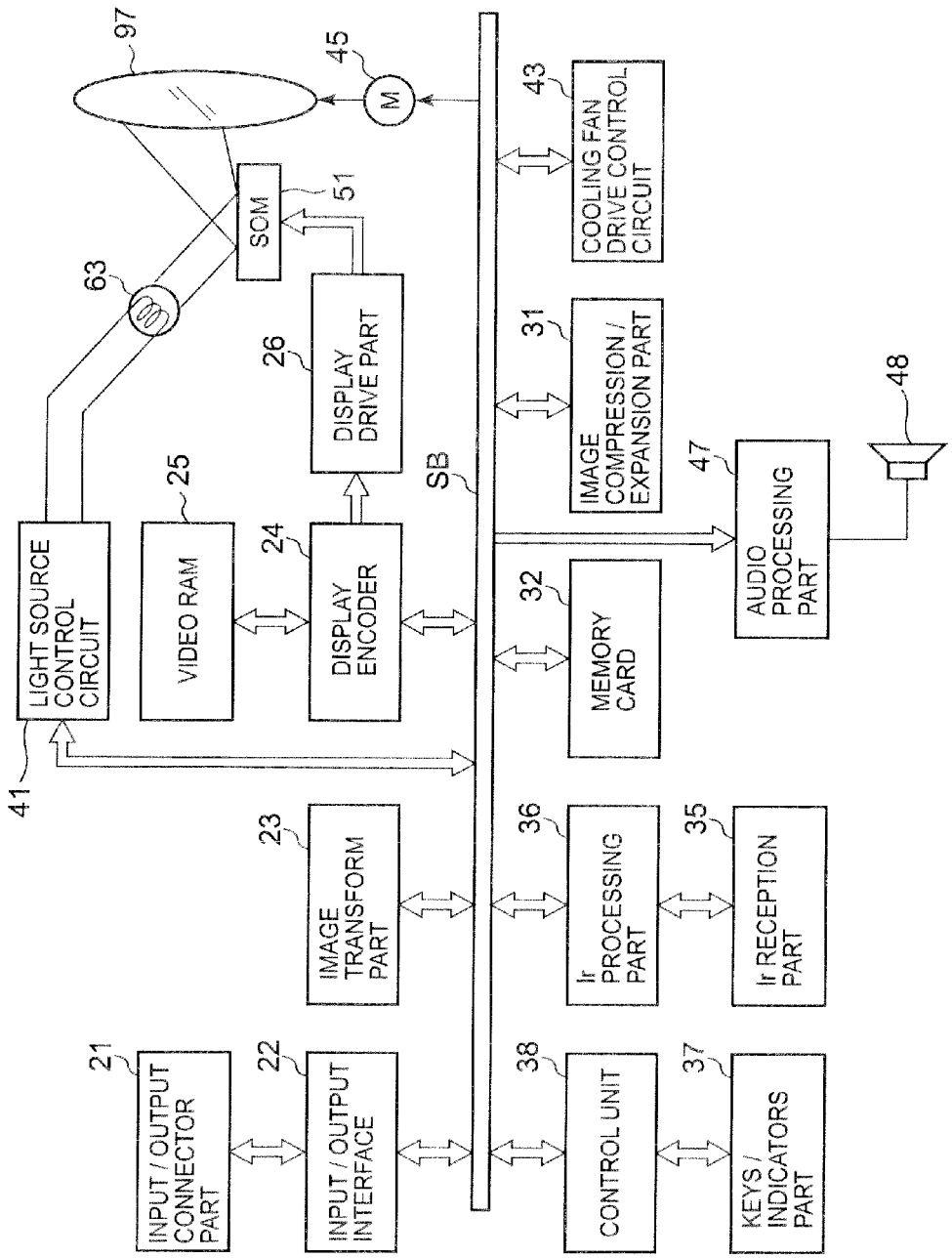
FIG. 2 is a functional circuit block diagram of the projector according to the embodiment of the invention.

Next, a projector control means for the projector 10 will be described by use of a block diagram in FIG. 2. The projector control means is made up of a control unit 38, an input/output interface 22, an image transform part 23, a display encoder 24, a display drive part 26 and the like. In addition, image signals of various standards that are entered from the input/output connector part 21 are sent via the input/output interface 22 and a system bus (SB) to the image transform part 23 where the image signals are transformed so as to be unified into an image signal of a predetermined format which is suitable for display. Thereafter, the image signals so transformed are then outputted to the display encoder 24.

The control unit 38 governs the control of respective operations of circuitries within the projector 10 and is made up of a CPU, a ROM which stores in a fixed fashion operation programs of various types of settings and a RAM which is used as a work memory.

In addition, the display encoder 24 deploys the image signals entered thereinto on a video RAM 25 for storage therein and generates a video signal from the contents stored in the video RAM 25, outputting the video signal so generated to the display drive part 26.

The display drive part 26 functions as a display device control means for driving a display device 51 which is a spatial optical modulator (SOM) at an appropriate frame rate in accordance with the image signal outputted from the display encoder 24. A light beam emitted from a light source unit 63 is shone on to the display device 51 via a light source optical system to thereby form an optical image by reflected light reflected at the display device 51, and the image so formed is then projected on to a screen, not shown, for display via a projection optical system 90, which will be described later. A movable lens group 97 of the projection optical system 90 is driven by a lens motor 45 for zooming or focusing.

In addition, an image compression/expansion part 31 performs a recording operation in which a luminance signal and a color-difference signal are data compressed through processings such as ADCT and Huffman coding so as to write them sequentially on a memory card 32 which is referred to as a detachable recording medium. Further, the image compression/expansion part 31 performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transform part 23 so as to enable the display of dynamic images on the basis of the image data stored on the memory card 32.

Operation signals generated at the keys/indicators part 37 which is made up of the main keys and indicators provided on the upper side panel 11 of the main body case are sent out directly to the control unit 38, while key operation signals generated by operating keys on the remote controller are received by the Ir reception part 35, and a code signal demodulated at an Ir processing part 36 is outputted to the control unit 38.

In addition, an audio processing part 47 is connected to the control unit 38 via the system bus (SB). This audio processing part 47 includes a sound source circuit such as a ECM sound source. When in a projection mode and a reproducing mode, the audio processing part 47 converts audio data into analog signals and drives a speaker 48 to output loudly sound or audio based on the audio data.

Additionally, the control unit 38 controls a light source control circuit 41 which constitutes a light source control means. This light source control circuit 41 controls the light source unit 63 so that light of a predetermined wavelength band that is required at the time of forming an image is emitted from the light source unit 63. Specifically, when light of a red wavelength band is required, the light source control circuit 41 turns off an excitation light source 72, which will be described later, and turns on a light emitting light source as a red light source. In addition, when light of a green wavelength band is required, the light source control circuit 41 turns on the excitation light source 72 and controls the wheel motor 73 so that a first luminescent light emitting area 2 or a second luminescent light emitting area 3 is positioned on an optical axis of excitation light. Further, when light of a blue wavelength band is required, the light source control circuit 41 turns on the excitation light source 72 and controls the wheel motor 73 so that a diffusion and transmission area 1 is positioned on the optical axis of the excitation light.

Further, the control unit 38 causes a cooling fan drive control circuit 43 to detect temperatures through a plurality of sensors which are provided at the light source unit 63 and the like so as to control the rotational speed of the cooling fan based on the results of the temperature detection. In addition, the control unit 38 also causes the cooling fan drive control circuit 43 to make the cooling fan continue to rotate even after the power supply of the projector main body is switched off by use of a timer or the like or to make the power supply to the projector main body be cut off depending upon the results of the temperature detection by the temperature sensors.

Figure 3:
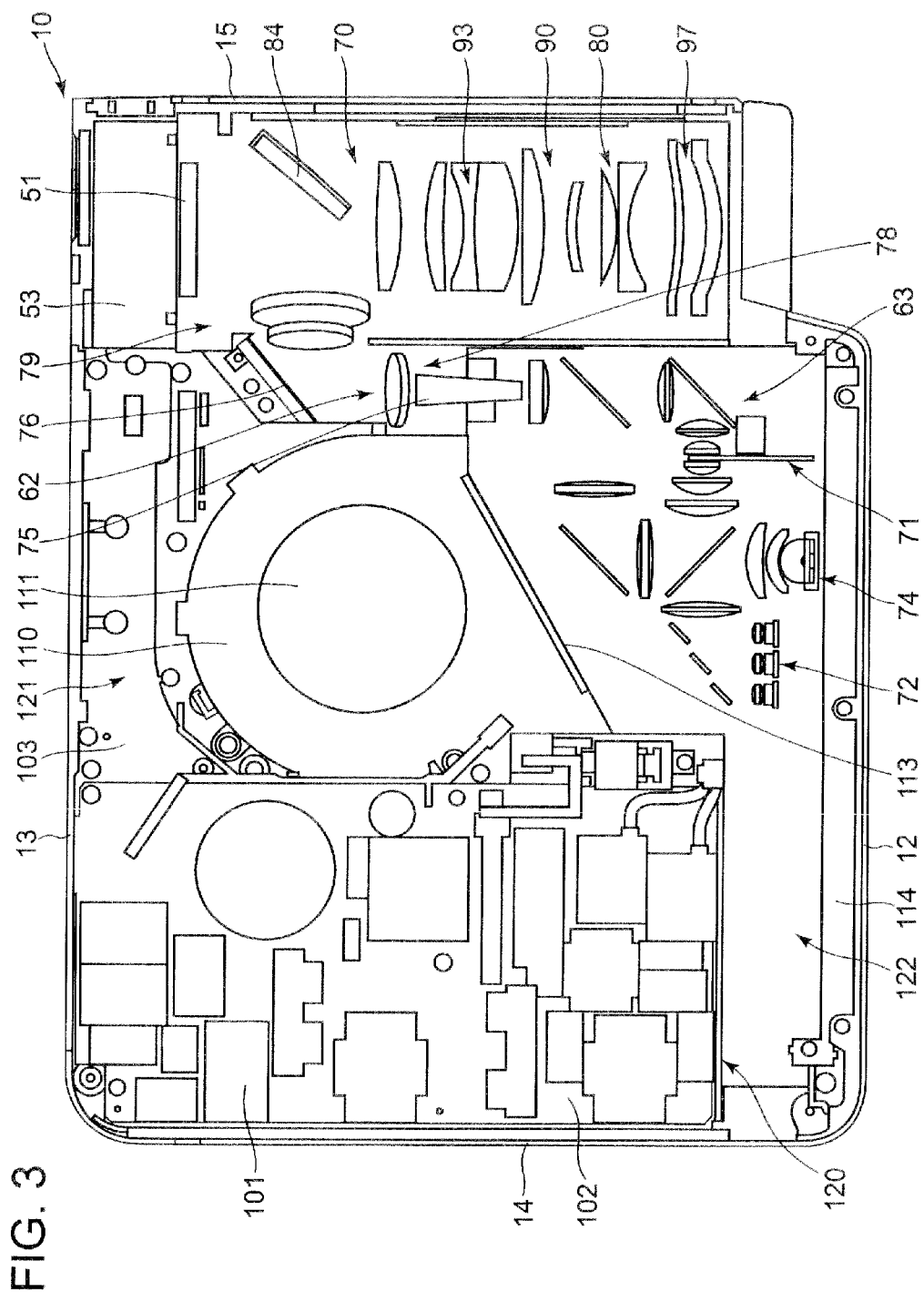
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As is shown in FIG. 3, in the projector 10, a light source control circuit board 102 is disposed in proximity to the right-hand side panel 14 and a power supply circuit block 101 and the like are mounted on this light source control circuit board 102. A sirocco fan-type blower 110 is disposed substantially at a center in the projector 10, and a control circuit board 103 is disposed in proximity to the blower 110. The light source 63 is disposed in proximity to the front panel 12, and an optical system unit 70 is disposed in proximity to the left-hand side panel 15.

Additionally, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its outside air inlet port 111 is positioned in the inlet side space compartment 121 and its outside air outlet port 113 is positioned on a boundary between the outlet side space compartment 122 and the inlet side space compartment 121.

The optical system unit 70 has a substantially U-shape and is made up of three blocks such as an illumination block 78 which is positioned in proximity to the light source unit 63, an image generation block 79 which is positioned on the back panel 13 side, and a projection block 80 which is positioned between the illumination block 78 and the left-hand side panel 15.

The illumination block 78 includes part of a light source optical system 62 for guiding light emitted from the light source unit 63 to the display device 51 which is included in the image generation block 79. The part of the light source optical system 62 that is included in the illumination block 78 includes a light guiding unit 75 for making a light beam emitted from the light source 63 into a light beam whose intensity is uniformly distributed and a collective lens for collecting light that has passed through the light guiding unit 75 for concentration.

The image generating block 79 has, as the light source optical system 62, an optical axis varying mirror 76 for varying a direction of an optical axis of a light beam that has emerged from the light guiding unit 75, a plurality of collective lenses for collecting light beams reflected by the optical axis varying mirror 76 for concentration on the display device 51 and a shining mirror 84 for shining the light beams that have passed through the collective lenses on to the display device 51 at a predetermined angle. Further, the image generating block 79 includes a DMD which is configured as the display device 51, and a display device cooling device 53 for cooling the display device 51 is disposed on a back panel 13 side of the display device 51 to thereby prevent the display device 51 from being heated to a high temperature.

The projection block 80 has a lens group of a projection optical system 90 which projects light on to the screen, which light is reflected by the display device 51 to form an image. The projection optical system 90 constitutes a variable focus lens made up of a fixed lens group 93 which is incorporated in a fixed lens barrel and a movable lens group 97 which is incorporated in a movable lens barrel and having a zooming function. This variable focus lens enables zooming and focusing operations by moving the movable lens group 97 by a lens motor.

Figure 4:
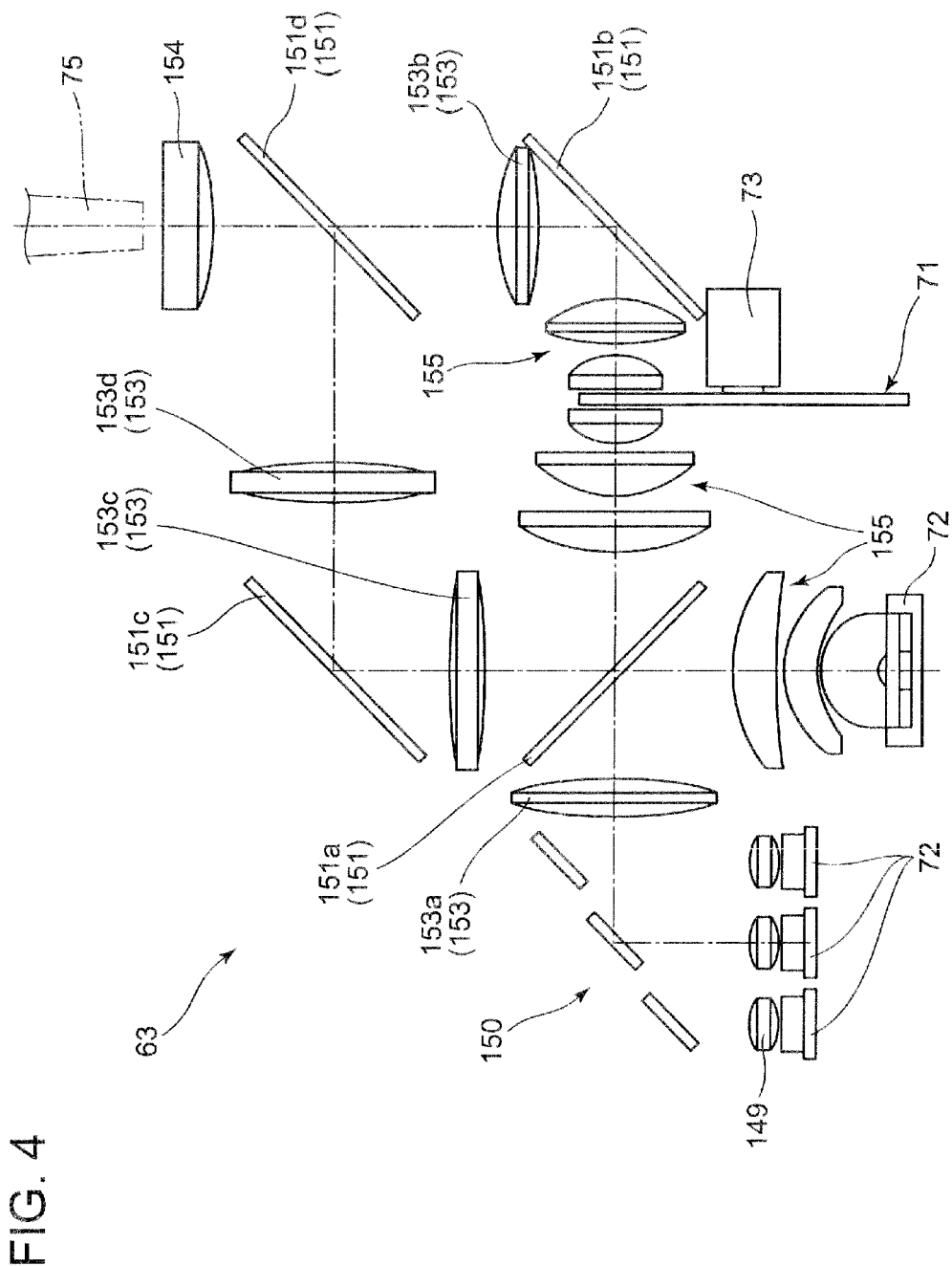
FIG. 4 is an exemplary plan view of a light source unit according to the embodiment of the invention.

Next, the light source unit 63 of the projector 10 according to the embodiment will be described. FIG. 4 is an exemplary plan view of the light source unit 63. As is shown in FIG. 4, the light source unit 63 includes a plurality of excitation light sources 72 which are disposed so that their optical axes become parallel to an axis of the light guiding unit 75, a plurality of collimator lenses 149 which are disposed in front of the excitation light sources 72, and a group of reflecting mirrors 150 for changing directions of optical axes of light beams that pass through the collimator lenses 149 at 90 degrees.

In addition, the light source unit 63 has an optical wheel 71 which is disposed on an optical axis of excitation light reflected on the reflecting mirror system 150 so that a rotating axis of the optical wheel 71 becomes parallel to the optical axis of excitation light, a wheel motor 73 which drives to rotate the optical wheel 71, a red light source (74) which is a light emitting light source 74 which is disposed so that an optical axis direction of excitation light when it is emitted from the excitation light source 72 becomes parallel to an optical axis of light emitted from the light emitting light source 74, and a collective optical system for collecting light beams emitted from the optical wheel 71 and the red light source (74) for concentration on a predetermined plane by matching the optical axis of the light beam emitted from the optical wheel 71 with the optical axis of the light beam emitted from the red light source (74).

In the excitation light sources 72, a plurality of blue laser emitters are arranged in a planar configuration to emit laser light of a blue wavelength band to the optical wheel 71 as excitation light and light of a blue wavelength band. In addition, the collimator lenses 149 emit forwards light emitted individually from the plurality of blue laser emitters of the excitation light sources 72 as parallel light at the front of the blue laser emitters. Further, the reflecting mirror system 150 is made up of a plurality of strip-like reflecting mirrors which are arranged into a step-like configuration to reflect light emitted from the excitation light sources 72 so that optical axes of light beams emitted from the excitation light sources 72 are change through 90 degrees.

Figure 5:
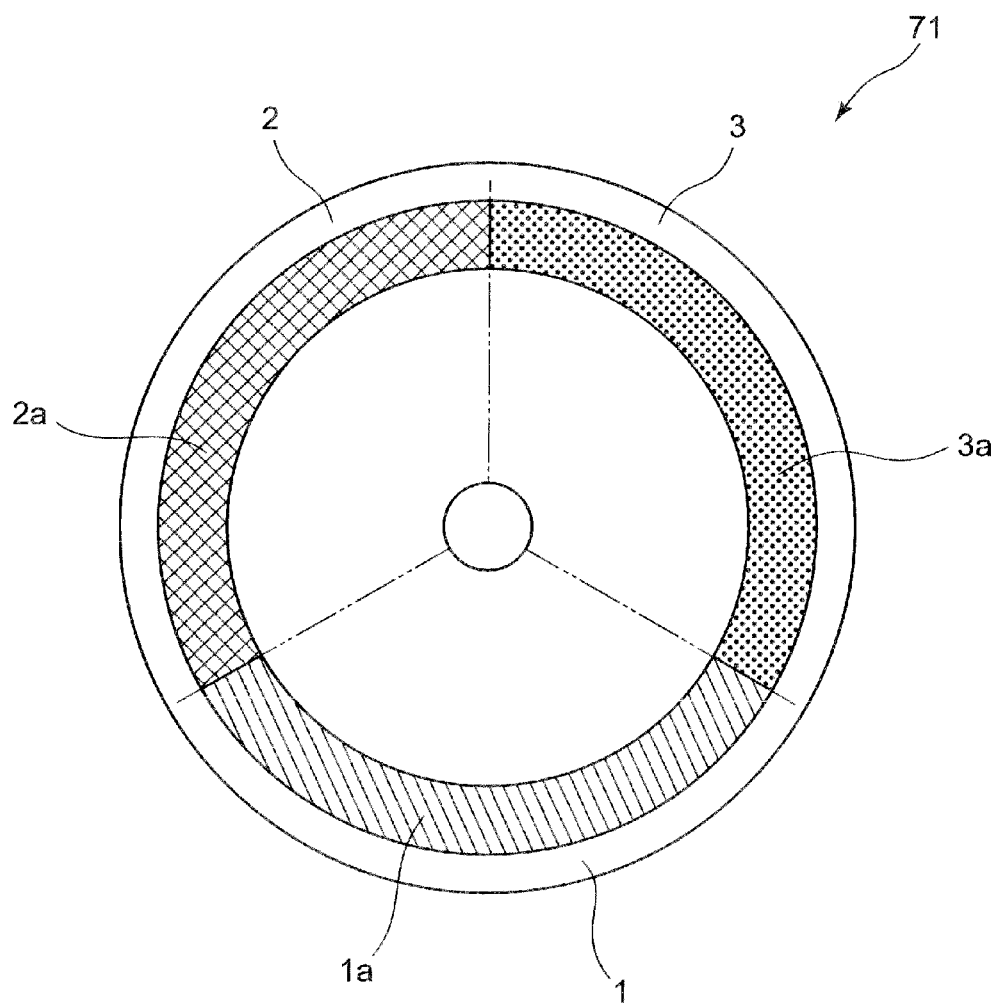
FIG. 5 is an exemplary front view of an optical wheel according to the embodiment of the invention.

As is shown in FIG. 5, the optical wheel 71 includes a diffusion and transmission area 1 for diffusing light emitted from the excitation light sources 72, a primary luminescent light emitting area 2 and a secondary luminescent light emitting area 3, and these areas are arranged end to end in a circumferential direction. In addition, in the optical wheel 71, a band-like diffusion and transmission layer 1a is formed in a position lying in proximity to an outer circumferential edge of the diffusion and transmission area 1. In addition, a band-like primary luminescent material layer 2a is formed in a position lying in proximity to an outer circumferential edge of the primary luminescent light emitting area 2. Further, a band-like secondary luminescent material layer 3a is formed in a position lying in proximity to an outer circumferential edge of the secondary luminescent light emitting area 3. These layers 1a, 2a, 3a are arranged end to end in the circumferential direction to thereby form a ring.

The diffusion and transmission layer 1a of the optical wheel 71 is formed of a material such as glass having a high light transmission property. A sand blasting treatment is applied to a surface of the diffusion and transmission layer 1a to thereby transmit light from the excitation light sources 72 while diffusing it. In addition, the primary luminescent material layer 2a is a green luminescent material layer which is formed by scattering green luminescent materials uniformly in a binder and is adapted to emit luminescent light of a green wavelength band by utilizing light emitted from the excitation light sources 72 as excitation light.

Further, the secondary luminescent material layer 3a is a green luminescent material layer which is formed by scattering green luminescent materials having a different hue from that of the primary luminescent material layer 2a uniformly in a binder.

Then, the primary luminescent material layer 2a and the secondary luminescent material layer 3a emit luminescent light in every direction by receiving excitation light emitted from the excitation light sources 72. In addition, a mirror treatment is given to a front surface of the optical wheel 71 at the areas where the primary luminescent material layer 2a and the secondary luminescent material layer 3a are disposed so that the front surface at those areas is formed as a reflecting surface. By forming the reflecting surface on the front surface of the optical wheel 71, luminescent light emitted to the front surface side of the optical wheel 71 is also reflected on the front surface of the optical wheel 71 so as to be emitted back towards the excitation light sources 72, and therefore, the utilization efficiency of luminescent light can be increased.

Namely, the optical wheel 71 of the embodiment has the plurality of segment areas, which include the luminescent light emitting areas where two or more luminescent material layers having different properties are arranged end to end in the circumferential direction.

The light emitting light source 74 is a red light source (74) such as a red light emitting diode which emits light of a red wavelength band. Then, this red light source (74) is disposed in a position lying between the excitation light sources 72 and the optical wheel 71 so that an optical axis direction of excitation light when it is emitted from the excitation light sources 72 and an optical axis direction of light emitted from the red light source (74) becomes parallel to each other.

In addition, the collective optical system includes a mirror system 151 which is made up of a plurality of mirrors, a convex lens system 153 which is made up of a plurality of convex lenses, a collective lens system 155 which is made up of collective lenses each of which is made by a combination of convex lenses, and a light guiding unit incident lens 154. The mirror system 151 includes a primary mirror 151a which is disposed in a position where an optical axis of excitation light which is reflected on the reflecting mirror system 150 and an optical axis of the red light source (74) intersect each other at right angles, a secondary mirror 151b which is disposed in a position which is situated on a rear surface side of the optical wheel 71 and where an extension of an axis of the light guiding unit 75 and an extension of the optical axis of the excitation light which is reflected on the reflecting mirror system 150 intersect each other at right angles, a tertiary mirror 151c which is disposed on the optical axis of the red light source (74) and a quaternary mirror 151d which is disposed in a position where an optical axis of light of a red wavelength band which is reflected on the tertiary mirror 151c and the extension of the axis of the light guiding unit 75 intersect each other at right angles.

The primary mirror 151a is a dichroic mirror which allows for passage of light emitted from the excitation light sources 72 and the red light source (74) and reflects luminescent light emitted from the optical wheel 71. In addition, the secondary mirror 151b is a reflecting mirror which makes the optical axis of light which is emitted from the excitation light sources 74 and which then passes through the optical wheel 71 while being diffused coincide with the axis of the light guiding unit 75. The tertiary mirror 151c is a reflecting mirror which reflects light emitted from the red light source (74) and luminescent light emitted from the optical wheel 71 towards the quaternary mirror 151d. The quaternary mirror 151d is a dichroic mirror which allows for passage of a light beam reflected by the secondary mirror 151b and reflects a light beam reflected by the tertiary mirror 151c.

In addition, the convex lens system 153, which constitutes the collective optical system, includes a primary convex lens 153a which is disposed between the excitation light sources 72 and the primary mirror 151a, a secondary convex lens 153b which is disposed between the secondary mirror 151b and the quaternary mirror 151d, a tertiary convex lens 153c which is disposed between the primary mirror 151a and the tertiary mirror 151c, and a quaternary convex lens 153d which is disposed between the tertiary mirror 151c and the quaternary mirror 151d.

Further, the collective lens system 155, which constitutes the collective optical system, includes the collective lens which is disposed in proximity to the red light source (74) and the collective lens which is disposed in proximity to front and rear surface sides of the optical wheel 71 and on the optical axis of light emitted from the excitation light sources 72 for convergence of light emitted from the red light source and the optical wheel 71. In addition, the light guiding unit incident lens 154, which constitutes the collective optical system, is disposed in proximity to the light guiding unit 75 for convergence of light emitted from the light source unit 63 to an incident plane of the light guiding unit 75.

Then, in the light source unit 63 configured as described above, blue laser light emitted from the excitation light sources 72 and reflected on the reflecting mirror system 150 is caused to converge by the primary convex lens 153a. Thereafter, the convergent light passes through the primary mirror 151a and is shone on to the luminescent light reflecting areas and the diffusion and transmission area on the optical wheel 71 by the collective lens system 155. In addition, light beams emitted from the excitation light sources 72 and shone on to the primary luminescent light emitting area 2 or the secondary luminescent light emitting area 3 excite the luminescent material as excitation light, and the luminescent material so excited then emits light of a predetermined wavelength band. Further, light beams emitted from the excitation light sources 72 and shone on to the diffusion and transmission area on the optical wheel 71 are diffused and are then converted in nature from coherent light into incoherent light so as to be emitted from the rear surface side of the optical wheel 71 as light of a blue wavelength band which is incoherent light.

Additionally, light of a red wavelength band which is emitted from the red light source (74) is caused to converge by the collective lens system 155 and passes through the primary mirror 151a. Luminescent light of the green wavelength band emitted from the optical wheel 71 towards the excitation light sources 72 is caused to converge by the collective lens system 155 so as to be shone on to the primary mirror 151a. Then, the light of the red wavelength band that has passed through the primary mirror 151a and the luminescent light that has been reflected on the primary mirror 151a are caused to converge by the tertiary convex lens 153c and the quaternary convex lens 153d and are reflected on the tertiary mirror 151c and the quaternary mirror 151d so as to be caused to converge to the incident plane of the light guiding unit 75 by the light guiding unit incident lens 154 to enter the light guiding unit 75.

Further, the light of the blue wavelength band that has passed through the optical wheel 71 while being diffused is caused to converge so as to be shone on to the secondary mirror 151b by the collective lens system 155. The light of the blue wavelength band is then reflected on the secondary mirror 151b, is caused to converge by the secondary convex lens 153b and passes through the quaternary mirror 151d. Thereafter, the light of the blue wavelength band is caused to converge to the incident plane of the light guiding unit 75 by the light guiding unit incident lens 154 so as to enter the light guiding unit 75.

Namely, luminescent light of the green wavelength band and light of the blue wavelength band emitted from the optical wheel 71 and light of the red wavelength band emitted from the red light source 74 passes through and/or are reflected on the quaternary mirror. Thereafter, light of the aforementioned wavelength bands are collected to the same optical path and then are caused to converge to the quaternary convex lens 153d so as to enter into the light guiding unit 75.

Next, the control of the light source unit 63 in the projector 10 will be described. FIGS. 6A and 6B show explanatory diagrams which explain a, control method of the light source unit 63 in the projector 10. As has been described before, according to the projector 10 of the embodiment, the projection is enabled in the two projection modes of different hues which are made up of the primary projection mode and the secondary projection mode. Namely, the projector 10 can implement projections by switching between the primary projection mode which utilizes the primary luminescent light emitting area 2 on the optical wheel 71 and the secondary projection mode which utilizes the secondary luminescent light emitting area 3 whose hue is different from that of the primary projection mode by controlling the light source control circuit 41 that has been described above by the projector control means.

Hereinafter, a specific control of the light source control circuit 41 by the projector control means will be described. As is shown in FIG. 6A, in the event of the primary projection mode, the projector control means makes the light source control circuit 41, functioning as the light source control means, execute a control of turning on the excitation light sources 72 and turning off the red light source (74) when the diffusion and transmission area 1 of the optical wheel 71 is positioned on the optical axis of excitation light and when the primary luminescent light emitting area 2 of the optical wheel 71 is positioned on the optical axis of excitation light.

In addition, the projector control means makes the light source control circuit 41 execute a control of turning off the excitation light sources 72 and turning on the red light source (74) when the secondary luminescent light emitting are 3 of the optical wheel 71 is positioned on the optical axis of excitation light.

To be specific, in the event of light being emitted from the light source unit 63 in the primary projection mode, light of the blue wavelength band, light of the green wavelength band and light of the red wavelength band are emitted sequentially from the light source unit 63 in that order. Consequently, in the event of the primary projection mode, the projector control means makes the display drive part 26, functioning as the display device control means, control the display device 51 so as to generate images in the order of light of the blue wavelength band, light of the green wavelength band and light of the red wavelength band.

Additionally, as is shown in FIG. 6B, in the event of the secondary projection mode, the projector control means makes the light source control means execute a control of turning on the excitation light sources 72 and turning off the red light source (74) when the diffusion and transmission area 1 of the optical wheel 71 is positioned on the optical axis of excitation light and when the secondary luminescent light emitting area 3 of the optical wheel 71 is positioned on, the optical axis of excitation light. In addition, the projector control means makes the light source control circuit 41 execute a control of turning off the excitation light sources 72 and turning on the red light source (74) when the primary luminescent light emitting area 2 of the optical wheel 71 is positioned on the optical axis of excitation light.

To be specific, in the event of light being emitted from the light source unit 63 in the secondary projection mode, light of the blue wavelength band, light of the red wavelength band and light of the green wavelength band are emitted sequentially from the light source unit 63 in that order. Consequently, in the event of the secondary projection mode, the projector control means makes the display device control means control the display device 51 so as to generate images in the order of light of the blue wavelength band, light of the red wavelength band and light of the green wavelength band.

Thus, according to the projector 10 of the embodiment, image projections in the different projection modes are enabled by making effective use of the area of the optical wheel 71 that is not conventionally used and controlling the light source control circuit 41 and the display drive part 26 by the projector control means.

In addition, in the light source unit 63 which includes the optical wheel 71, the excitation light sources 72 and the light emitting light source 74, the optical wheel 71 is made up of the primary luminescent light emitting area 2, the secondary luminescent light emitting area 3 and the diffusion and transmission area 1. In addition, the luminescent material layer which emits light of the predetermined wavelength band is formed on the secondary luminescent light emitting area 3. Thus, the different luminescent light can be obtained by use of the area that is not conventionally used.

Further, according to the light source unit 63 of the embodiment, the blue laser light emitters are used as the excitation light sources. This enables light having high energy to be used as excitation light, thereby making it possible to increase the excitation efficiency of the luminescent materials. In addition, the red light emitting diode is used as the light emitting light source 74 and the green luminescent material is used on the primary luminescent material layer 2*a*. This enables light of the predetermined wavelength band to be obtained with good efficiency.

Figure 7A:
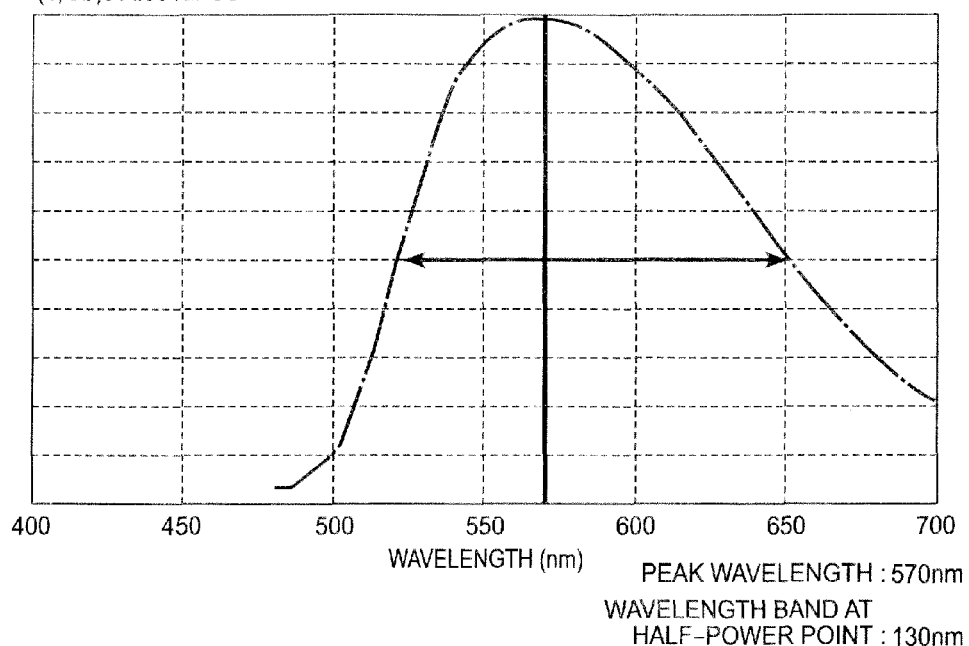
FIGS. 7A and 7B show emission spectrum examples of green luminescent materials which can emit light of green wavelength bands according to the embodiment of the invention.
Figure 7B:
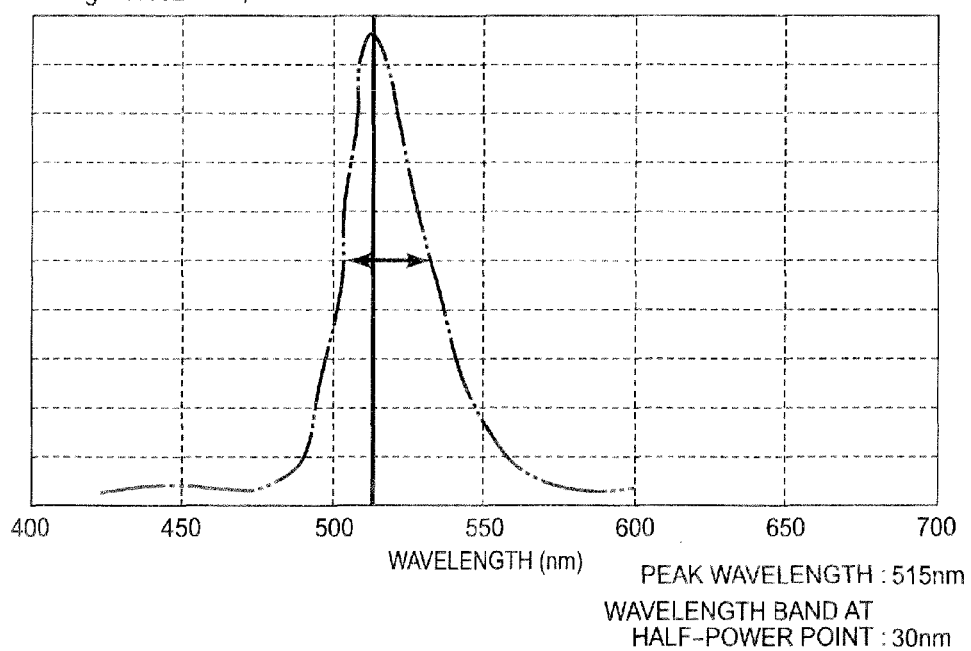

In addition, according to the light source unit 63 of the embodiment, the primary luminescent material layer 2*a* is made of a luminescent material having an emission spectrum characteristic shown in FIG. 7A which has a peak wavelength of 570 nm and a wavelength band at half-power point of 130 nm. In addition, the secondary luminescent material layer 3*a* is made of a luminescent material having an emission spectrum characteristic shown in FIG. 7B which has a peak wavelength of 515 nm and a wavelength band at half-power point of 30 nm. Thus, the light source unit 63 can be provided which can emit two types of light of different green wavelength bands and having different hues.

Further, the front surfaces of the portions of the optical wheel 71 where the primary luminescent light emitting area 2 and the secondary luminescent light emitting area 3 are formed or at least the front surfaces of the areas of the portions of the optical wheel 71 where the secondary luminescent material layer 2*a* and the secondary luminescent material layer 3*a* are disposed are formed as the reflecting planes. By adopting this configuration, light beams emitted from the luminescent materials towards the front surface side of the optical wheel 71 can also be made to be effective light by being reflected on the reflecting planes. Therefore, the utilization efficiency of light emitted can be increased.

Thus, according to the projector 10 which uses the light source unit 63 which is configured as described above, different types of white light can be produced by switching the projection modes. For example, when the projector 10 is used in a bright environment, a projection with a high luminance mode in which lightness is high can be enabled, whereas in a dark environment, a projection with a mode in which the color purity of green is high can be enabled.

Further, since the different projection modes are made to be realized by changing light emitted from the light source unit 63, compared with a configuration in which projection modes are changed by correcting images by CPU or the like, the load borne by the CPU can be reduced.

Note that the invention is not limited to the embodiment where the second luminescent material layer 3*a* is the green luminescent material layer which can emit light of the green wavelength band whose hue is different from that green light emitted from the primary luminescent material layer 2*a*. For example, the optical wheel 71 can be configured as having a secondary luminescent material layer 3*a* which is a green luminescent material layer which can emit light of a green wavelength band by forming the green luminescent material layer of the same luminescent material as that of the primary luminescent material layer 2*a* with a different ratio at which the green luminescent material is contained in the luminescent material layer.

Further, in the embodiment, while the different luminescent materials are used to emit the two types of light of the green wavelength bands which have the different hues, the invention is not limited thereto. For example, two types of light of green wavelength bands may be used which have different quantum efficiencies.

Further, two types of light of green wavelength bands may be used which have different quantum efficiencies with respect to temperature. As this occurs, although not illustrated, a temperature sensor is provided, and the projection modes are switched based on the temperature detected.

Furthermore, a secondary luminescent material layer 3*a* may be a green luminescent material layer which can emit light of a green wavelength band by forming the secondary material layer 3*a* of the same luminescent material of the primary luminescent material layer 2*a* with the same ratio as that of the primary luminescent material layer 2*a* at which the luminescent material is contained in the luminescent material layer but with a different thickness at which the secondary luminescent material layer 3*a* is disposed.

In addition, in the light source unit 63 of the embodiment, the primary luminescent material layer 2*a* and the secondary luminescent material layer 3*a* are the green luminescent material layers which can emit the two types of light of the green wavelength bands which have the different hues. However, the invention is not limited thereto. For example, the optical wheel 71 can be configured as having a primary luminescent material layer 2*a* and a secondary luminescent material layer 3*a* which constitute the same luminescent material layers 2*a*, 3*a*. To be specific, the same green luminescent material layers are formed on the primary luminescent light emitting area 2 and the secondary luminescent light emitting area 3 of the optical wheel 71.

According to the light source unit 63 which includes the optical wheel 71 described above, the deterioration with age of the green luminescent material on to which the blue laser light having high directivity is shone and the binder can be suppressed, whereby the light source unit 63 can be provided which can maintain its performance over a long period of time.

Further, in the embodiment, the red light emitting diode is used as the light emitting light source 74, and the green luminescent materials are used in the primary luminescent material layer 2*a* and the secondary luminescent material layer 3*a*. However, the invention is not limited thereto. For example, a configuration can also be adopted in which a green light emitting diode is used as the light emitting light source 74 and a red luminescent material is used on the optical wheel 71.

Note that in the event that image projections in the different projection modes are performed in the projector 10, a configuration may be adopted in which the optical wheel 71 is rotated reversely by controlling the light source control means by the projector control means. To be specific, in the event of the primary projection mode, a similar control to the control shown in FIG. 6A is performed. However, in the event of the secondary projection mode, the projector control means makes the light source control means execute a control of rotating the wheel motor 73 reversely.

In this way, by adopting the configuration in which in the secondary projection mode, the wheel motor 73 is rotated reversely to the rotating direction thereof in the primary projection mode, when light is emitted from the light source unit 63, light of the blue wavelength band, light of the green wavelength band and light of the red wavelength band are emitted sequentially from the light source unit 63 in that order at all times. Consequently, since the display drive part 26 may only have to control the display device 51 in the same way whether the primary projection mode or the secondary projection mode is used, the way of controlling the display device 51 does not have to be changed depending upon the projection mode used, thereby making it possible to project images in the different projection modes only by controlling the light source unit 63.

As this occurs, the optical wheel 71 is in such a state that the primary luminescent light emitting area 2 and the secondary luminescent light emitting area 3 are disposed in an axial symmetrical fashion with respect to a center line of the diffusion and transmission area 1.

Then, according to the projector 10 which is controlled in the way described above by the projector control means, the way of controlling the display device 51 is not changed whether the primary projection mode or the secondary projection mode is used due to the switching between the primary projection mode and the secondary projection mode being implemented by reversing the rotating direction of the optical wheel 71. Thus, the load borne by the CPU or the like can be reduced.

In addition, as an independent light emitting light source, a light source unit 63' may be configured by utilizing two light emitting light sources 74 consisting of a red light source (74a) and a blue light source (74b), and not providing the diffusion and transmission portion but providing more than three types of the green light emitting luminescent materials on the optical wheel 71.

This light source unit 63' emits light of a red wavelength band which is emitted from the red light source (74a) as the light emitting light source 74 so that the light beam becomes parallel to the front panel 12. The light source unit 63' includes the wheel motor 73 and an optical wheel 71' which are disposed in proximity to the inside of the front panel 12.

Figure 8:
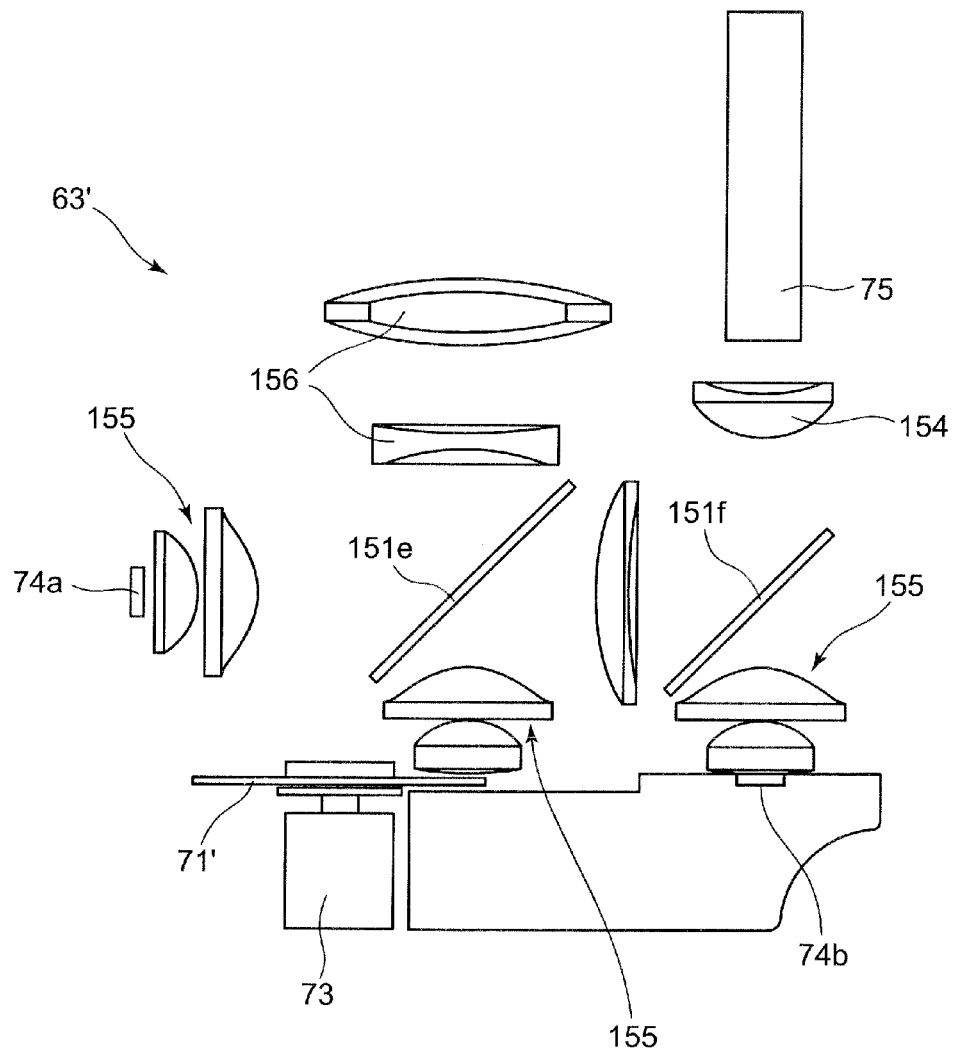
FIG. 8 is an exemplary plan view of a main part of a light source unit according to another embodiment of the invention.

Additionally, as shown in FIG. 8, excitation light from the excitation light source 72 is shone on to the optical wheel 71' via a convex lens and a concave lens as a convergence lens 156 for causing a light beam of emitted light to converge which is a parallel light beam from the excitation light source 72, not shown.

The collective lens system 155 is disposed just proximal to an excitation light source side of the optical wheel 71'. Light emitted from the excitation light source 72 is caused to converge so as to be incident into a luminescent material on the optical wheel 71', and luminescent light emitted from the optical wheel 71' is caused to converge so as to be emitted to the excitation light source side by the collective les system 155.

The light source unit 63' emits light of a red wavelength band from the red light source (74a) via the collective lens system 155 which is disposed just in front of the red light source (74a). A primary dichroic mirror 151e is disposed in a position where an optical axis of light of the red wavelength band emitted from the red light source (74a) and an optical axis of light of a green wavelength band emitted from the optical wheel 71 intersect each other.

The primary dichroic mirror 151e allows light of the red wavelength band and light of the blue wave length band which is excitation light to pass through and reflects light of the green wavelength band. Due to the property, light of the green wavelength band is reflected on the primary dichroic mirror 151e. Light of the green wavelength band so reflected travels towards a left-hand side panel 15 of the projector 10 with making its optical axis coincide with the optical axis of light of the red wavelength band.

In addition, the light source unit 63' includes a blue light source (74b) as the light emitting light source 74 which is a light emitting diode in proximity to the inside of the front panel 12 on the optical axis of the light guiding unit 75.

The collective lens system 155 is disposed in proximity to the blue light source (74b). Light of the blue wavelength band emitted from the blue light source (74b) is caused to converge and an optical axis of light of the blue wavelength band is made to coincide with the optical axis of the light guiding unit 75 by the collective lens system 155 so that light of the blue wavelength band emitted from the blue light source (74b) can be incident into the light guiding unit 75 via the light guiding unit incident lens 154.

A secondary dichroic mirror 151f is disposed in a position where the optical axis of light of the red wavelength band emitted from the red light source (74a) and the optical axis of light of a blue wavelength band emitted from the blue light source (74b) intersect each other.

The secondary dichroic mirror 151f reflects light of the red wavelength band and light of the green wave length band and allows light of the blue wavelength band to pass therethrough. Light which has been reflected by the secondary dichroic mirror 151f and light which has passed through the secondary dichroic mirror 151f are each caused their optical axes to coincide each other to converged by the light guiding unit incident lens 154 so as to be incident into the light guiding unit 75, as well as the embodiment that has been described by reference to FIGS. 3 and 4.

Figure 9:
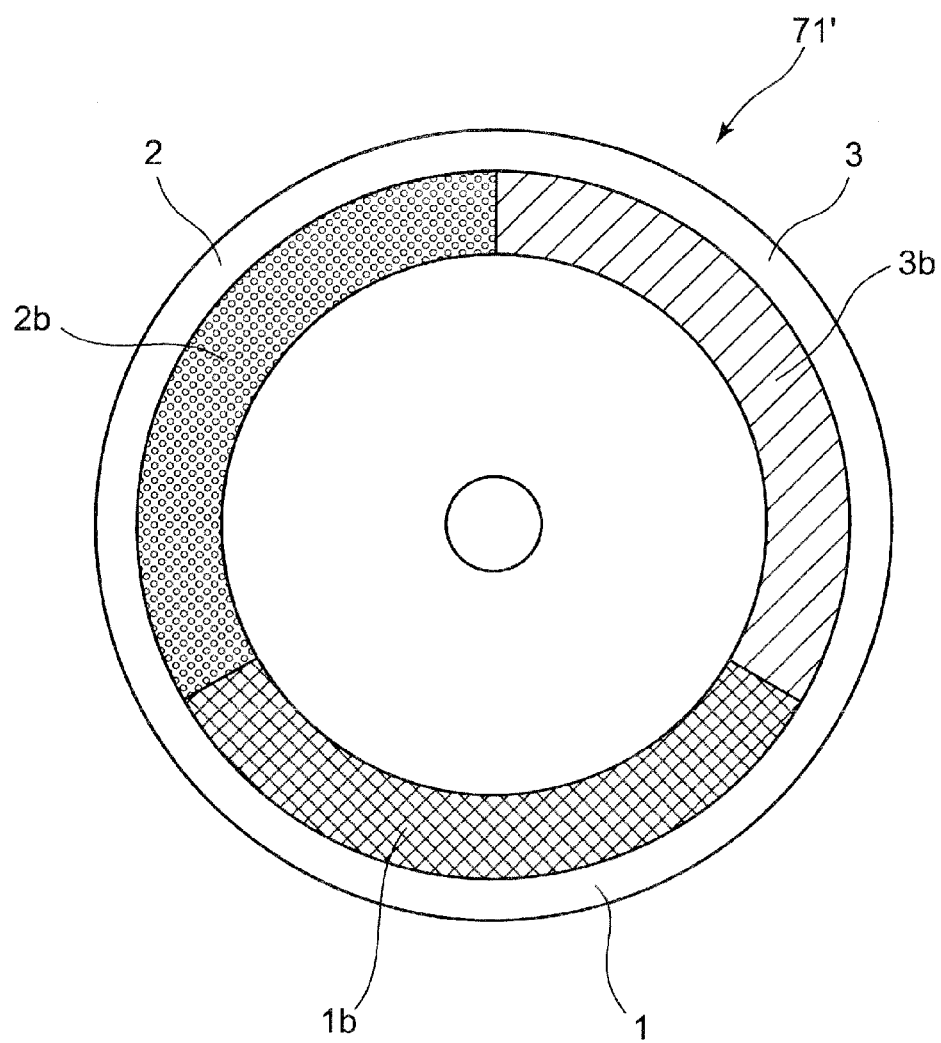
FIG. 9 is an exemplary front view of an optical wheel according to another embodiment of the invention.

Three types of luminescent material layers are formed of green light emitting luminescent materials on the optical wheel 71' of the light source unit 63' so as to attain a high lightness/saturation mode, a high luminance mode, and a normal mode. Specifically, as shown in FIG. 9, there are provided a primary light emitting area 1, a secondary light emitting area 2, and a tertiary light emitting area 3, each of which forms respectively a primary luminescent material layer 1b which utilizes a luminescent material for high lightness/saturation having high color purity, a secondary luminescent material layer 2b which utilizes a luminescent material for high luminance having high luminance property, and a tertiary luminescent material layer 3b which utilizes a luminescent material having average luminance and saturation.

Figure 10A:
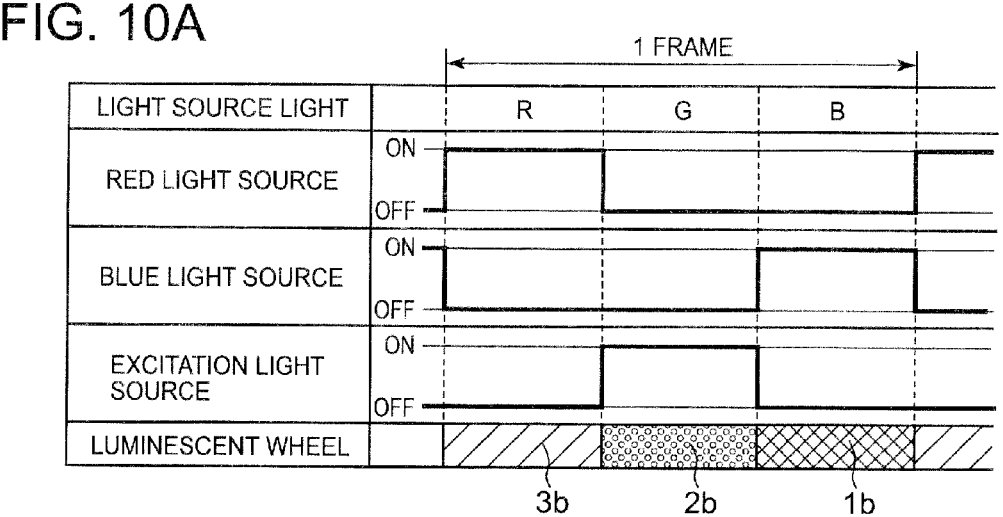
FIGS. 10A, 10B, and 10C show explanatory diagrams which explain a control method of the light source unit in the projector according to another embodiment of the invention.

As shown in FIG. 10A, when a projector projects images in the high luminance mode, a light source control circuit 41 for executing a control of turning-on the light source unit 63' controls turn-on timings of the red light source (74a), the excitation light source 72, and the blue light source (74b) sequentially, and also controls a rotation timing of the optical wheel 71' so that light emitted from the excitation light source 72 is incident into the secondary luminescent material layer 2b for the high luminance mode.

Figure 10B:
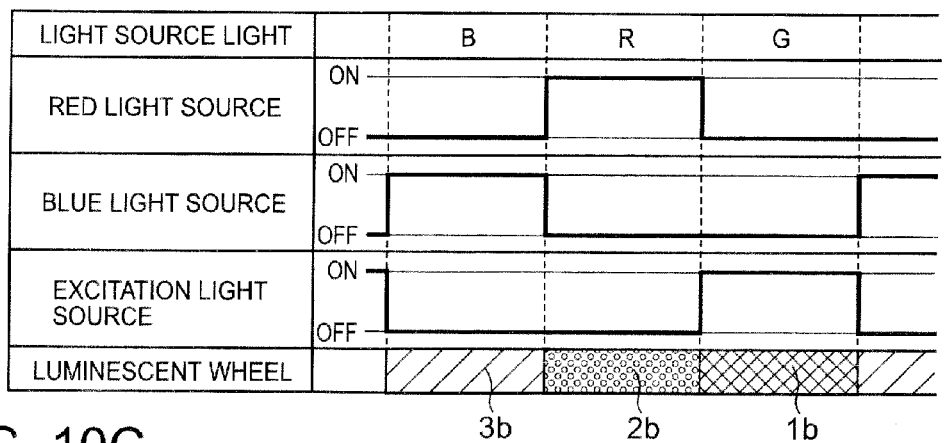
Figure 10C:
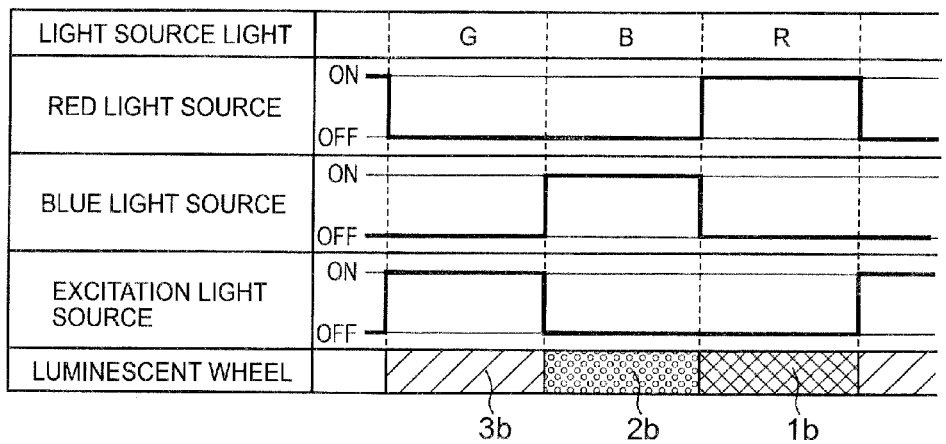

As shown in FIG. 10B, when the projector projects images in the high lightness/saturation mode, the light source control circuit 41 controls turn-on timings of the red light source (74a), the excitation light source 72, and the blue light source (74b) sequentially, and also controls a rotation timing of the optical wheel 71' so that light emitted from the excitation light source 72 is incident into the primary luminescent material layer 1b for the high lightness/saturation mode.

In addition, as shown in FIG. 10O, when, the projector projects images in the normal mode, the light source control circuit 41 controls turn-on timings of the red light source (74a), the excitation light source 72, and the blue light source (74b) sequentially, and also controls a rotation timing of the optical wheel 71' so that light emitted from the excitation light source 72 is incident into the tertiary luminescent material layer 3b for the normal mode.

Note that electric voltage or an effective value of applied voltage which is applied to the light emitting light source 74 should be adjusted depending upon which light emitting area among the primary light emitting area 1 to the tertiary light emitting area 3 the excitation light to be shone on to.

Therefore, the projector having the light source unit 63' can reduce a luminance difference between each light of color wavelength bands. In addition, the projector can permit projections in different modes by utilizing effectively a whole circumference of the optical wheel 71' by providing the optical wheel 71' with luminescent material layers which emit green light having different lightness or saturation and without forming any non-use area on the whole circumference.

Figure 11:
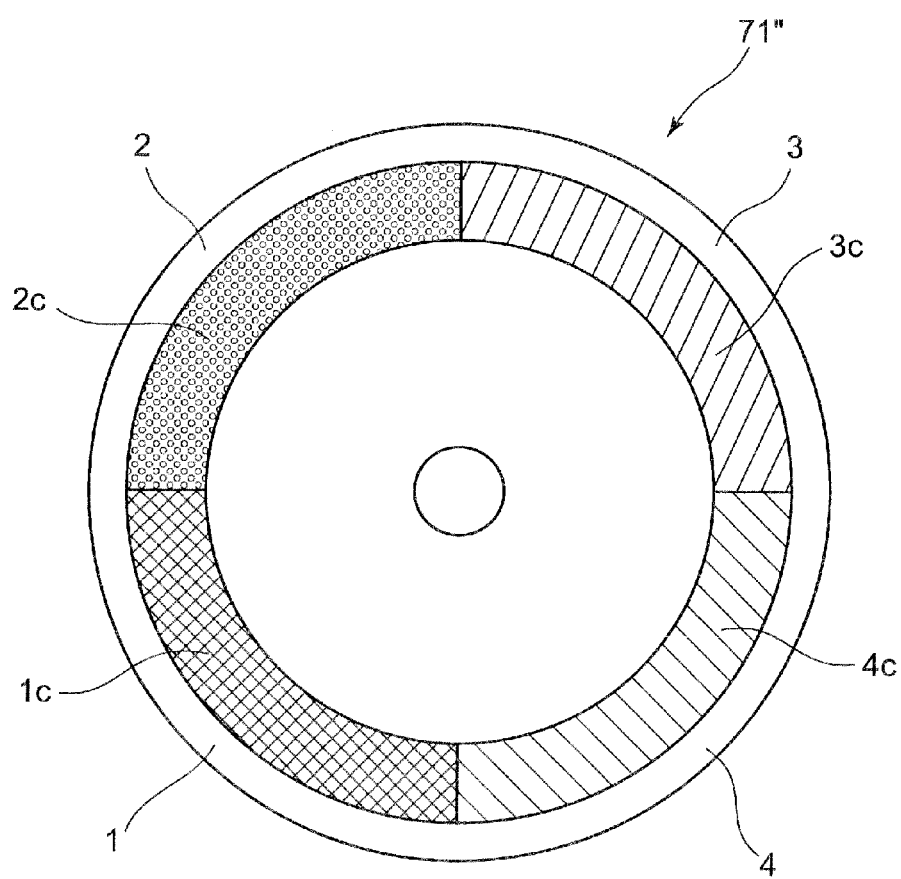
FIG. 11 is an exemplary front view of another optical wheel according to another embodiment of the invention.

Additionally, the whole circumference of the optical wheel may be divided into four light emitting areas, as shown in FIG. 11, for providing a quaternary luminescent material layer 4c in one of the light emitting areas so divided which is a quaternary light emitting area 4. In the rest three out of four light emitting areas, a primary luminescent material layer 1c is formed which is a green light emitting luminescent material having high color purity in a primary light emitting area 1, a secondary luminescent material layer 2c is formed which is a green light emitting luminescent material having high lightness in a secondary light emitting area 2, and a tertiary luminescent material layer 3c is formed which is a green light emitting luminescent material having average luminance and saturation in a tertiary light emitting area 3, as described in the above embodiment.

The light source control circuit 41 executes a control of turning-on the red light source (74a) and the blue light source (74b) while shining excitation light on to one of the light emitting areas, from the primary light emitting area 1 to the tertiary light emitting area 3. Further, the light source control circuit 41 shines excitation light on to part of the quaternary luminescent material layer 4c which is an yellow light emitting luminescent material of the quaternary light emitting area 4 while the red light source (74a) or the blue light source (74b) is turned on to thereby add light of an yellow wavelength band to light of the red wavelength band or to light of the blue wavelength band which are emitted from the independent light source 74. By these controls of the light source control circuit 41, luminance of a projected image can be increased.

Figure 12:
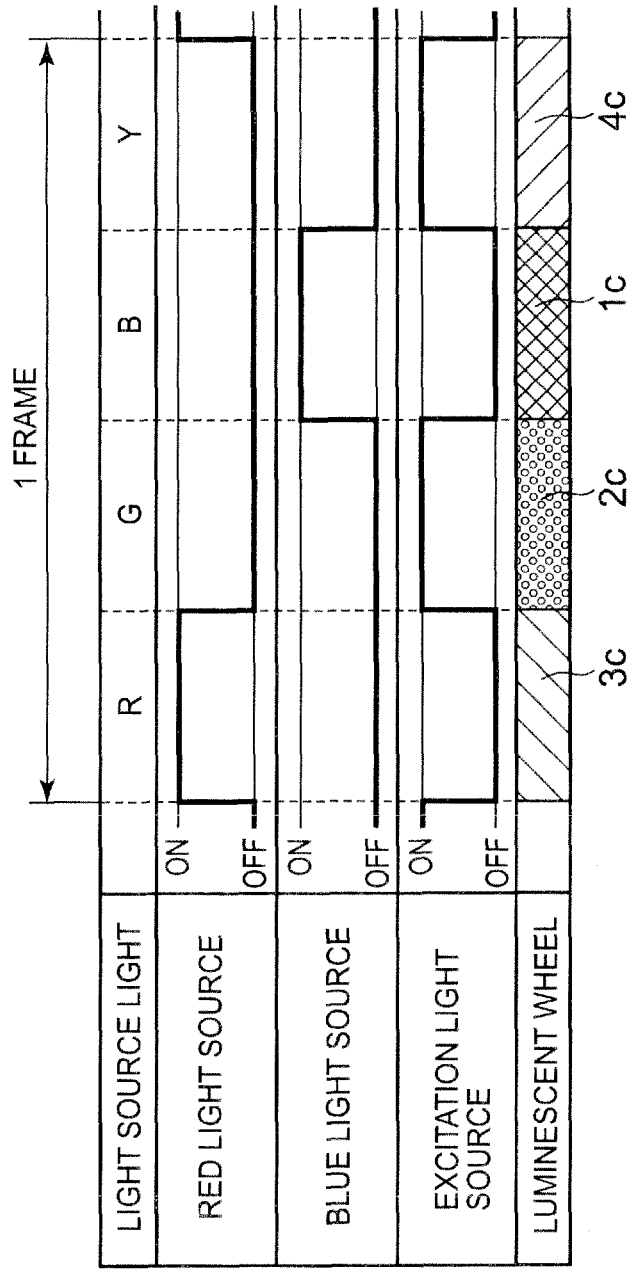
FIG. 12 shows explanatory diagrams which explain another control method of the light source unit in the projector according to another embodiment of the invention.

In addition, as shown in FIG. 12, there may be a case that in order to increase luminance of a projected image, the light source control circuit 41 executes a control of turning on the excitation light source 72 so as to shine excitation light on to the secondary luminescent material layer 2c of the secondary light emitting area 2 and the quaternary luminescent material layer 4c of the quaternary light emitting area 4, and simultaneously executes a control of turning on the red light source (74a) and the blue light source (74b) to thereby add light of the yellow wavelength band emitted from an optical wheel 71" to light of the red wavelength band emitted from the red light source (74a), light of a green wavelength band emitted from the optical wheel 71", and light of the blue wavelength band (74b).

Furthermore, the projector 10 comprising the light source unit 63' can project white light by light of the yellow wavelength band emitted from the optical wheel 71" having the quaternary luminescent material layer 4c which is the yellow light emitting luminescent material in the quaternary light emitting area 4 and light of the blue wavelength band emitted from the blue light source (74b).

Note that the invention is not limited to the embodiment that has been described heretofore and hence can be freely modified or improved without departing from the spirit and scope of the invention.

What is claimed is:

1. A light source unit comprising:

an excitation light source for shining light of a predetermined wavelength band;

an optical wheel having a plurality of segment areas, the plurality of segment areas including at least two luminescent material layers having different characteristics and a transmission portion which transmits light emitted from the excitation light source, wherein the plurality of segment areas are provided side by side in a circumferential direction;

a rotation driving unit for driving to rotate the optical wheel;

a light emitting element provided out of an optical path of the optical wheel;

a light guiding optical system for guiding a light beam emitted from the optical wheel and a light beam emitted from the light emitting element to converge to a same optical path; and a control unit for turning on the excitation light source when any one of the transmission portion and the luminescent material layers is positioned on an optical axis of excitation light and for turning on the light emitting element for a period of time during which the excitation light source does not shine the excitation light wherein in the optical wheel, at least areas of luminescent light emitting areas where the luminescent material layers are provided are formed as reflecting planes.

2. The light source unit according to claim 1, wherein:

the excitation light source comprises a blue laser emitter;

the light emitting element comprises a red light emitting diode or a red laser emitter; and the luminescent material layers include at least a green luminescent material.

3. The light source unit according to claim 1, wherein green luminescent material layers which are configured to emit different types of light of green wavelength bands which have different hues are formed, respectively, as the at least two luminescent material layers having the different characteristics.

4. A projector comprising:

the light source unit according to claim 1;

a light guiding unit;

a display device; and a projection optical system;

wherein the projector has a plurality of projection modes, and wherein, according to each of the plurality of projection modes, a segment area of the luminescent material layer onto which light from the excitation light source is shone and a segment area of the luminescent material layer onto which light from the excitation light source is not shone are varied.

\* \* \* \* \*